United States Patent
Oono (10) Patent No.: US 8,112,221 B2
(45) Date of Patent: Feb. 7, 2012

(54) NAVIGATION APPARATUS FOR VEHICLE

(75) Inventor: Hiroshi Oono, Kariya (JP)

(73) Assignee: DENSO CORPORATION, Kariya (JP)

( * ) Notice: Subject to any disclaimer, the term of this patent is extended or adjusted under 35 U.S.C. 154(b) by 1007 days.

(21) Appl. No.: 12/073,476

(22) Filed: Mar. 6, 2008

(65) Prior Publication Data

US 2008/0221789 A1 Sep. 11, 2008

(30) Foreign Application Priority Data

Mar. 9, 2007 (JP) ................................. 2007-60092

(51) Int. Cl.
G01C 21/26 (2006.01)
G11B 19/02 (2006.01)

(52) U.S. Cl. .... 701/208; 701/207; 369/53.1; 369/53.42; 360/5; 360/6; 360/75; 360/97.02

(58) Field of Classification Search .................. 701/207, 701/208, 209, 214; 369/53.1, 53.42; 360/69.75, 360/97.02, 5, 6
See application file for complete search history.

(56) References Cited

U.S. PATENT DOCUMENTS

| | | | | |
|---|---|---|---|---|
| 5,825,581 A * | 10/1998 | Morita et al. | ............... | 360/78.04 |
| 6,151,183 A * | 11/2000 | Ogasawara et al. | ............. | 360/75 |
| 7,079,348 B2 * | 7/2006 | Ishii et al. | ........................ | 360/75 |
| 7,123,449 B2 * | 10/2006 | Kang | .......................... | 360/235.8 |
| 7,130,138 B2 * | 10/2006 | Lum et al. | ........................ | 360/31 |
| 7,161,758 B2 * | 1/2007 | Adapathya et al. | ............. | 360/69 |
| 7,171,305 B2 * | 1/2007 | Minato et al. | ................. | 701/209 |
| 7,333,282 B2 * | 2/2008 | Iseri et al. | ........................ | 360/60 |
| 7,630,157 B1 * | 12/2009 | Goeppner et al. | ............... | 360/60 |
| 7,733,595 B2 * | 6/2010 | Lucas et al. | ..................... | 360/75 |
| 7,903,364 B2 * | 3/2011 | Jeong | ............................. | 360/75 |
| 2002/0093753 A1 * | 7/2002 | Atsumi | ..................... | 360/73.03 |
| 2004/0264028 A1 | 12/2004 | Ishii et al. | | |
| 2008/0186621 A1 * | 8/2008 | Partee | ........................ | 360/97.02 |

FOREIGN PATENT DOCUMENTS

| | | |
|---|---|---|
| JP | A-04-011353 | 1/1992 |
| JP | A-H11-050901 | 2/1999 |
| JP | A-2001-004382 | 1/2001 |
| JP | A-2001-014784 | 1/2001 |
| JP | A-2003-109293 | 4/2003 |

(Continued)

OTHER PUBLICATIONS

Office Action dated Jan. 20, 2009 in corresponding Japanese patent application No. 2007-060092 (and English translation).

(Continued)

*Primary Examiner* — Thomas Black
*Assistant Examiner* — Peter D Nolan
(74) *Attorney, Agent, or Firm* — Posz Law Group, PLC (57) ABSTRACT

In an in-vehicle navigation apparatus, a present position is detected, an altitude of the present position is acquired from map data, and a temperature inside of a hard disk drive is acquired with a temperature sensor. An atmospheric pressure of the present position is then calculated from the altitude and temperature. When the calculated atmospheric pressure is less than a predetermined atmospheric pressure, it is presumed that a magnetic head cannot be floating against a magnetic disk in the hard disk drive. Access to the hard disk drive is thereby prohibited. Thus, in the hard disk drive of the navigation apparatus, contact between the magnetic head and the magnetic disk is prevented when running a place with a low atmospheric pressure.

2 Claims, 5 Drawing Sheets

FOREIGN PATENT DOCUMENTS

| | | |
|---|---|---|
| JP | A-2004-264115 | 9/2004 |
| JP | A-2004-288294 | 10/2004 |
| JP | 2006351136 A * | 12/2006 |
| JP | A-2006-351136 | 12/2006 |
| JP | A-2007-026620 | 2/2007 |
| JP | A-2008-164499 | 7/2008 |

OTHER PUBLICATIONS

Office Action dated Jan. 20, 2009 in corresponding Japanese patent application No. 2007-060092 (and English translation).

* cited by examiner

NAVIGATION APPARATUS FOR VEHICLE

CROSS REFERENCE TO RELATED APPLICATION

This application is based on and incorporates herein by reference Japanese Patent Application No. 2007-60092 filed on Mar. 9, 2007.

FIELD OF THE INVENTION

The present invention relates to a vehicular navigation apparatus having a hard disk drive, and relates to, in particular, a technology to help prevent a magnetic head from contacting a magnetic disk at the time of accessing the hard disk drive.

BACKGROUND OF THE INVENTION

A recent navigation apparatus can provide not only a two dimensional map but also a bird's-eye view, which makes a present position more discernible. Further, the navigation apparatus is required to have another function such as recording user's favorite songs. Thus, in the navigation apparatus, a storage medium for storing map data is required to have more data volume. To that end, a CD-ROM or DVD-ROM is generally replaced by a hard disk drive (HDD).

A hard disk drive typically contains a magnetic disk for storing data and a magnetic head for writing and reading data with the magnetic disk. With an access from a control device, a magnetic disk rotates, thereby generating wind force of air streams. The wind force causes the magnetic head to separate from the magnetic disk with a minute gap (about 0.1 micrometer); namely, the magnetic head is in a lifting state in which the magnetic head is lifting or floating from the magnetic disk. In such a lifting state, the magnetic head performs writing or reading data with the magnetic disk.

Thus, a hard disk drive has a structure in which a magnetic head is lifted from a magnetic disk with a minute gap using wind force resulting from rotation of the magnetic disk. When writing or reading data is performed based on an access from a control device, a vibration or impact may be exerted. In such a case, the magnetic head may abut on the magnetic disk to thereby damage the magnetic disk or destroy data.

Patent document 1 describes a technology to record, in map data, certain places where vibration or impact may be exerted to a vehicle passing therethrough. Thus, if a vehicle passes through the certain place, an access to the hard disk drive is prohibited.

Patent document 1: JP-2004-264115 A

In short, in Patent document 1, when passing through the certain place where vibration or impact occurs, an access to the hard disk drive is prohibited. As explained above, a hard disk drive has a structure in which a magnetic head is lifted from a magnetic disk using wind force of air streams resulting from rotation of the magnetic disk. Therefore, if the wind force produced by rotation of the magnetic disk is small, the magnetic head may not be floated and the magnetic head may continue contacting the magnetic disk.

The wind force of air streams produced by the rotation of the magnetic disk changes depending on a density of the air. That is, even if the stream has the same speed, a resulting wind force is increased as the density of the air is increased; a resulting wind force is decreased as the density of the air is decreased. The density of the air is influenced by an atmospheric pressure and the atmospheric pressures is fundamentally influenced by an altitude. For example, a road may run on a high ground (e.g., several thousands meters above sea-level). In such a high ground, an atmospheric pressure is low; therefore the density of the air is low. The wind power of the air stream produced by the rotation of the magnetic disk is thereby decreased; therefore, the magnetic head may not be maintained in the lifting state against the magnetic disk. In this case, even if there is neither vibration nor impact, the magnetic head and the magnetic disk may contact each other to thereby damage the magnetic disk. That is, when running a high ground where an atmospheric pressure is low, the technology of Patent document 1 cannot solve such a problem.

SUMMARY OF THE INVENTION

The present invention is made in view of the problem above. It is an object of the present invention to provide a vehicular navigation apparatus to help prevent a magnetic head from contacting a magnetic disk in a hard disk drive even if a subject vehicle runs a place having a low atmospheric pressure.

According to a first embodiment of the present invention, a navigation apparatus for a vehicle is provided as follows. The apparatus is configured to facilitate (i) storing map data in a hard disk drive having a magnetic disk and a magnetic head, (ii) reading from the hard disk drive map data relative to a proximity of a present position acquired from a present position detection device, and (iii) displaying the read map data in a display device. The apparatus comprises: (i) an atmospheric pressure acquisition unit configured to acquire an atmospheric pressure of the present position; and (ii) an access prohibition control unit configured to prohibit an access to the hard disk drive when the acquired atmospheric pressure is less than a predetermined value.

According to a second embodiment of the present invention, a navigation apparatus for a vehicle is provided as follows. The apparatus is configured to facilitate (i) storing map data in a hard disk drive having a magnetic disk and a magnetic head, (ii) reading from the hard disk drive map data relative to a proximity of a present position acquired from a present position detection device, and (iii) displaying the read map data in a display device. The apparatus comprises: (i) an atmospheric pressure acquisition unit configured to acquire an atmospheric pressure of the present position; (ii) a vibration acquisition unit configured to acquire a vibration amount generated by a travel of the vehicle; (iii) a marginal vibration acquisition unit configured to acquire a marginal vibration level which allows the magnetic head to maintain a lift from the magnetic disk at the acquired atmospheric pressure; and (iv) an access prohibition control unit configured to prohibit an access to the hard disk drive when the acquired vibration amount exceeds the marginal vibration level.

According to a third embodiment of the present invention, a navigation apparatus for a vehicle is provided as follows. The apparatus is configured to facilitate (i) storing map data in a hard disk drive having a magnetic disk and a magnetic head, (ii) reading from the hard disk drive map data relative to a proximity of a present position acquired from a present position detection device, and (iii) displaying the read map data in a display device. The apparatus comprises: (i) an atmospheric pressure acquisition unit configured to acquire an atmospheric pressure of the present position; (ii) a vibration acquisition unit configured to acquire a vibration amount generated by a travel of the vehicle; (iii) a marginal atmospheric pressure acquisition unit configured to acquire a marginal atmospheric pressure which allows the magnetic head to maintain a lift from the magnetic disk at the acquired vibration amount; and (iv) an access prohibition control unit configured to prohibit an access to the hard disk drive when the acquired atmospheric pressure is less than the marginal atmospheric pressure.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
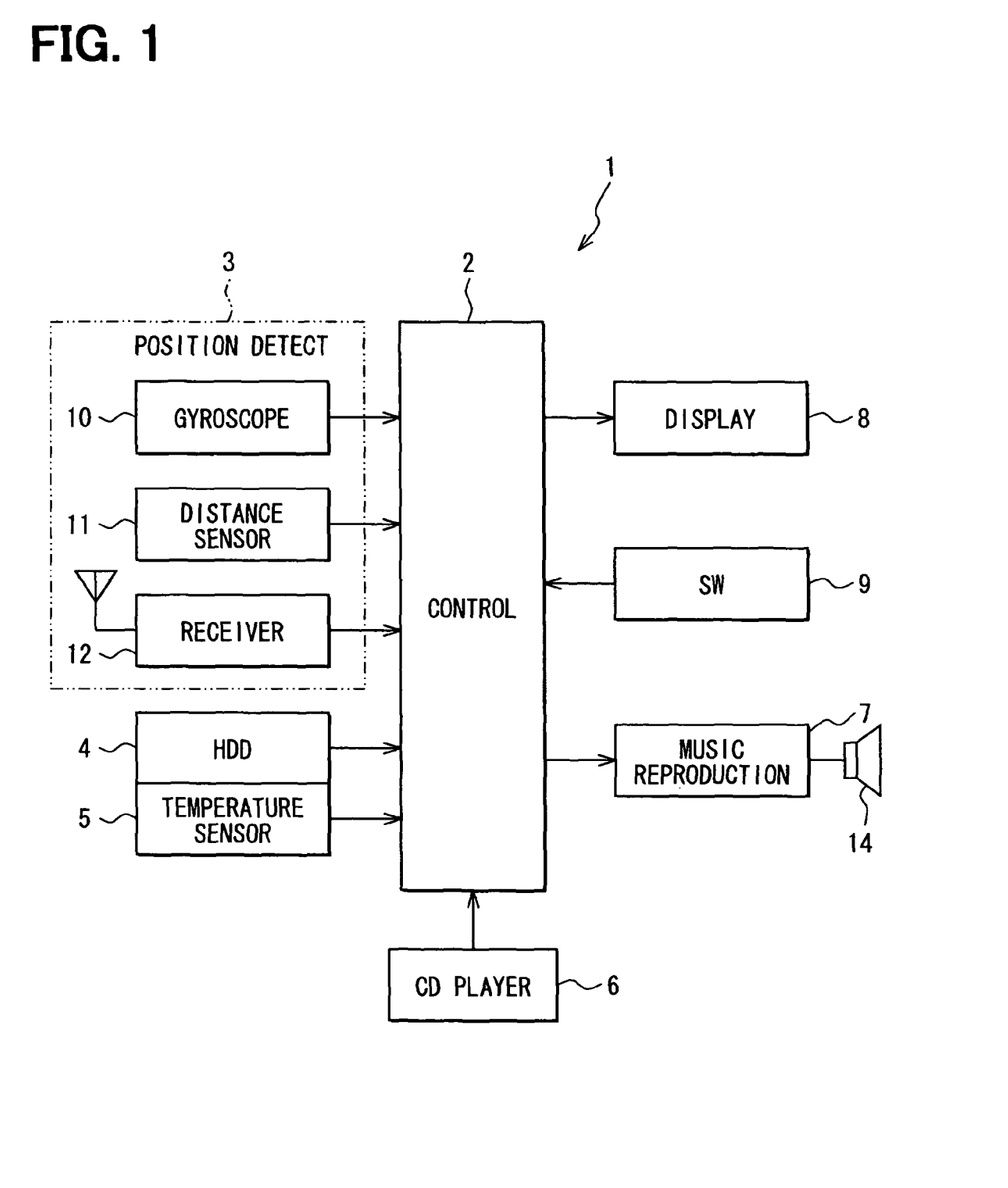
FIG. 1 is a block diagram illustrating a configuration of a navigation apparatus according to a first embodiment of the present invention.
Figure 2:
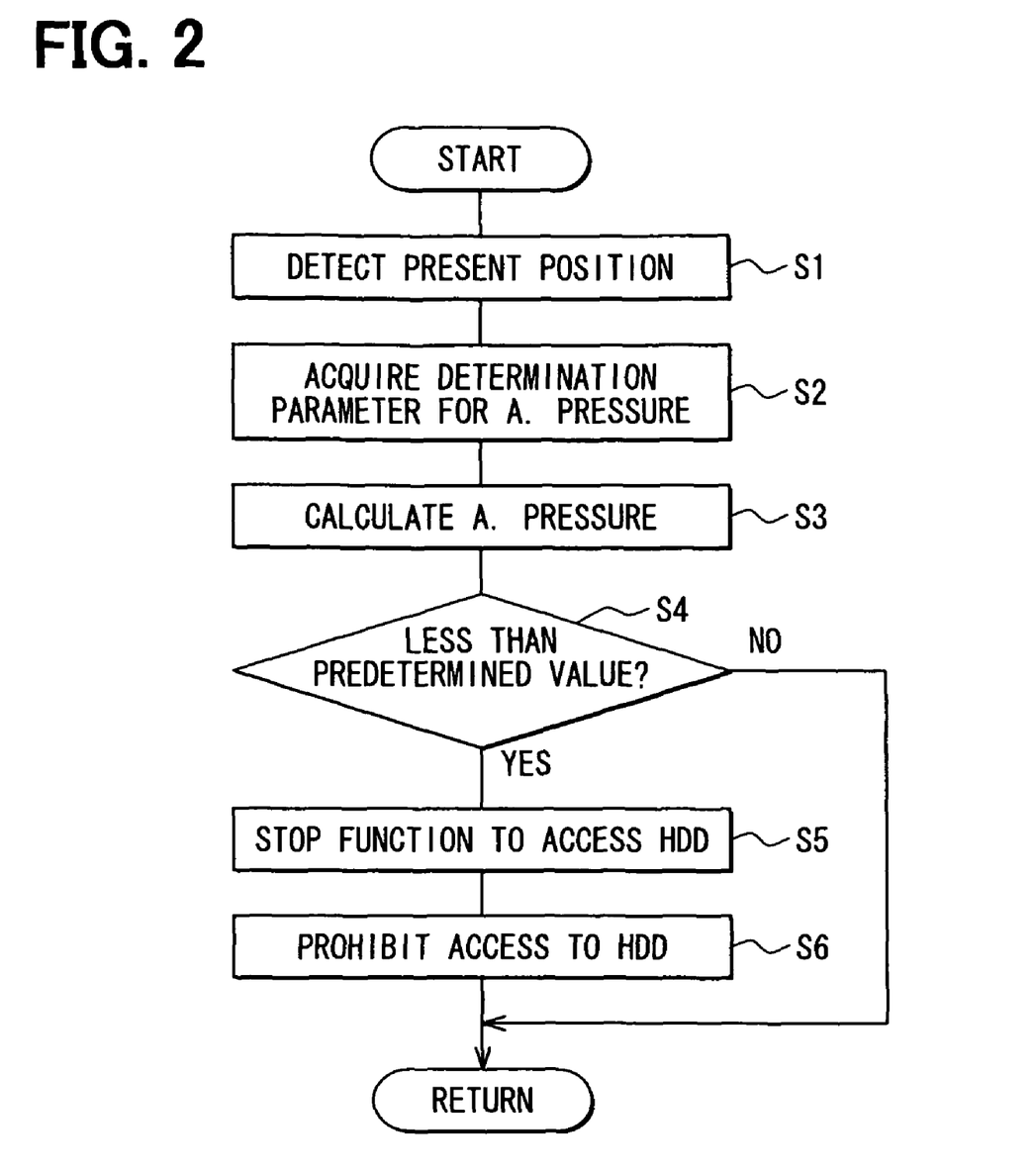
FIG. 2 is a flowchart illustrating a control process for prohibiting an access to a hard disk drive of the navigation apparatus according to the first embodiment.

FIG. 1 and FIG. 2 illustrate a first embodiment of the present invention.

A configuration of an in-vehicle navigation apparatus 1 mounted in a subject vehicle according to the first embodiment is shown in a block diagram of FIG. 1. The in-vehicle navigation apparatus 1 includes audio equipment. The navigation apparatus 1 includes: a control circuit 2 as a control device, a present position detection device 3 as a present position detection means, a hard disk drive 4 as a map data storage device, a temperature sensor 5 to detect a temperature inside the hard disk drive 4, a CD player 6 as an audio device, a music reproduction device 7, a display device 8 as a displaying means, and a switching device 9.

The control circuit 2 has a function to control overall operations of the navigation apparatus 1. The control circuit 2 includes a microcomputer having a CPU, ROM, RAM, I/O, and a bus connecting the foregoing (none shown). The ROM stores an execution program for operating the navigation apparatus 1. The RAM temporarily stores (i) data in executing a program or (ii) map data which are acquired from the hard disk drive 4.

The present position detection device 3 includes a gyroscope 10, a distance sensor 11, and a GPS (Global Positioning System) receiver 12. These sensors or the like 10 to 12 have different types of detection errors from each other. Those detection errors are mutually complemented to thereby provide a high-precision position detection. Part of the sensors or the like 10 to 12 may be used depending on a required detection accuracy as needed. Furthermore, the present position detection device 3 may include a rotation sensor for detecting rotation of a steering wheel or a wheel sensor for detecting a rotation of each wheel.

The hard disk drive 4 contains a magnetic disk and a magnetic head, which performs writing data in the magnetic disk or reading out data from the magnetic disk. The magnetic head is movable over a radial direction of the magnetic disk. In a rotation stopped state, in which rotation of the magnetic disk is stopped, the magnetic head make a contact with a position outside of a data record area in a surface or side of the magnetic disk. Based on an access from the control circuit 2, data are written in the magnetic disk or read out from the magnetic disk. In this case, as the magnetic disk rotates, air streams arise in the surface of the magnetic disk to thereby generate a wind force. The wind force lifts or floats the magnetic head slightly from the surface of the magnetic disk (i.e., the magnetic head is maintained in a lifting state with a gap). In such a lifting state, the magnetic head is radially moved to an intended position of the data record area from the position outside of the data record area of the magnetic disk. Thus writing or reading of data is performed.

The magnetic disk of this hard disk drive 4 records, for instance, the following data: map data for displaying map in the display device 8, data for map matching, position retrieval data for searching destinations intended by a user, and data for guiding routes with sounds. The map data include information on altitude above sea level (altitude information) relative to each place or point. Moreover, the magnetic disk further records songs or music compositions (i.e., music data) preferred by a user. In other words, songs can be written in the magnetic disk. Writing of music data is performed as follows. A music CD disk is inserted into the CD player 6, and a recording mode is selected using the switching device 9. In the recording mode, a user may select a preferred one from among songs recorded in the music CD disk.

The music reproduction device 7 reproduces music data, which are read via the hard disk drive 4 or CD player 6, and outputs the reproduced music data via a speaker 14. Moreover, the music reproduction device 7 outputs guidance sounds via the speaker 14 at the time of route guidance. The display device 8 includes a liquid crystal display for displaying map data, characters, signs, etc. The switching device 9 includes a touch panel provided on a display screen of the display device 8 or a mechanical switch disposed in a peripheral area of the display screen.

In the navigation apparatus 1, the control circuit 2 acquires a present position from the present position detection device 3. The control circuit 2 accesses the hard disk drive 4 and acquires map data relative to a proximity of the present position. The map data are then displayed in the display device 8. The above process is repeatedly executed by the control circuit 2. Moreover, based on an operation via the switching device 9, the reproduction mode of the hard disk drive 4 or the reproduction mode of the CD player 6 may be designated. The music data written in the hard disk drive 4 or the music data recorded in the CD are reproduced and outputted via the speaker 14.

In the present embodiment, to avoid the magnetic head of the hard disk drive 4 from contacting the magnet disk rotating, an access to the hard disk drive 4 is prohibited depending on an atmospheric pressure of a present position. This is performed based on the following backgrounds. The contact between the magnetic head and magnetic disk occurs because of lack of the wind force of air streams produced by rotation of the magnetic disk. Since the rotational speed of the magnetic disk is constant, the wind force varies depending on the density of the air and the density of the air varies depending on an atmospheric pressure. For this reason, when an atmospheric pressure is low, it becomes difficult to hold the magnetic head in the lifting state, where the magnetic head is floating from the magnetic disk. An access to the hard disk drive 4 is thus prohibited.

In the present embodiment, an atmospheric pressure of a present position is not obtained by directly measuring an atmospheric pressure. Instead, an atmospheric pressure is presumed or calculated by using atmospheric pressure determination information (determination parameters). The determination parameters are relative to (i) an altitude (above sea level) and (ii) a temperature (internal temperature) inside of the hard disk drive 4. These determination parameters are substituted to a predetermined formula to thereby obtain an atmospheric pressure. The reason why an altitude is used for a determination parameter is that an atmospheric pressure changes depending on an altitude fundamentally. Moreover, even at the same altitude, an atmospheric pressure varies depending on a temperature. Thus, an atmospheric pressure is calculated also in consideration of an internal temperature of the hard disk drive 4.

Now, a control process for prohibiting an access to the hard disk drive 4 is executed by the control circuit 2 according to a flowchart illustrated in FIG. 2. With a start of the control process, the control circuit 2 detects or acquires a present position of the subject vehicle from measurement data of the present position detection device 3 (S1). Thus, processing at S1 may function as a present position acquisition means or unit. Next, the control circuit 2 detects an altitude of the present position and an internal temperature of the hard disk drive 4 as the determination parameters for presuming an atmospheric pressure (S2). Thus, processing at S2 may function as a determination information acquisition means or unit. The control circuit 2 calculates an atmospheric pressure of the present position using the determination parameters of the altitude and the internal temperature (S3). Thus, processing at S3 may function as an atmospheric pressure acquisition means or unit.

After calculating the atmospheric pressure P of the present position, the control circuit 2 determines whether the calculated atmospheric pressure P is less than a predetermined value P0 stored in the ROM (storage device) (S4). Thus, processing at S4 may function as a determination means or unit. The predetermined value P0 is designated as a minimum atmospheric pressure to allow the magnetic head to be floated from the magnetic disk. The predetermined value P0 is obtained from an experiment or calculation. When it is determined that the atmospheric pressure P is not less than the predetermined value P0 (S4: "NO"), it is determined that a wind force allowing the lifting state of the magnetic head is obtained. The processing is then returned. In such a case, an access to the hard disk drive 4 can be freely executed when the control circuit 2 needs.

In contrast, when it is determined that the atmospheric pressure P is less than the predetermined value P0 (S4: "YES"), the control circuit 2 determines that the wind force allowing the lifting state of the magnetic head is not obtained. The control circuit 2 stops any function which needs an access to the hard disk drive 4 (S5). For instance, such a function includes displaying a map in the display device 8, writing of music data in the magnetic disk, or reproducing of music data written in the magnetic disk. Thereby, the magnetic head of the hard disk drive 4 moves out of the data record area of the magnetic disk, and the rotation of the magnetic disk is stopped. The control circuit 2 then prohibits an access to the hard disk drive 4 (S6). Thus, processing at S6 may function as an access prohibition control means or unit.

As mentioned above, when an atmospheric pressure is less than the predetermined value P0, an access to the hard disk drive 4 is prohibited. The magnetic head of the hard disk drive 4 is held in the position outside of the record area in the surface of the magnetic disk remaining in a stopping state. This effectively helps prevent an occurrence of a failure that the contact of the magnetic head with the magnetic disk causes a damage on a surface of the magnetic disk to thereby destroy data written in the surface of the magnetic disk.

Second Embodiment

Figure 3:
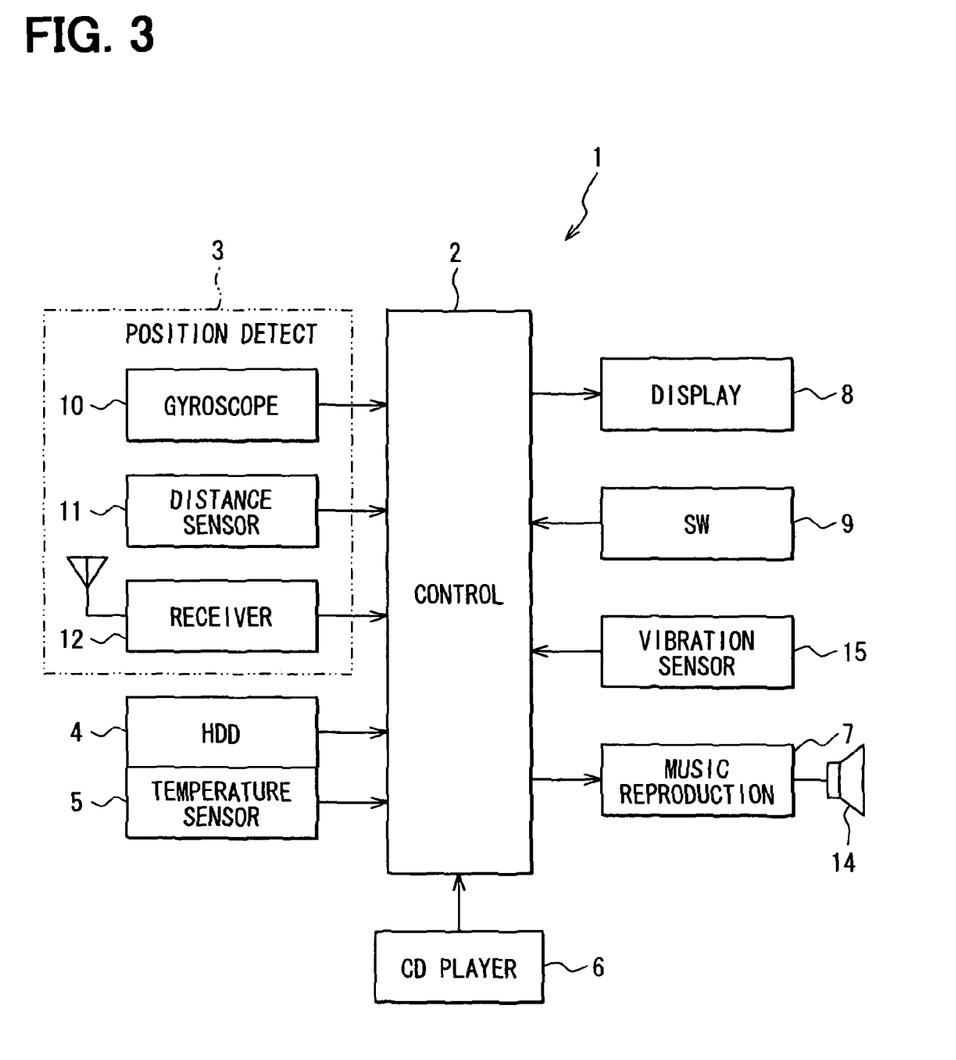
FIG. 3 is a block diagram illustrating a configuration of a navigation apparatus according to a second embodiment of the present invention.
Figure 4:
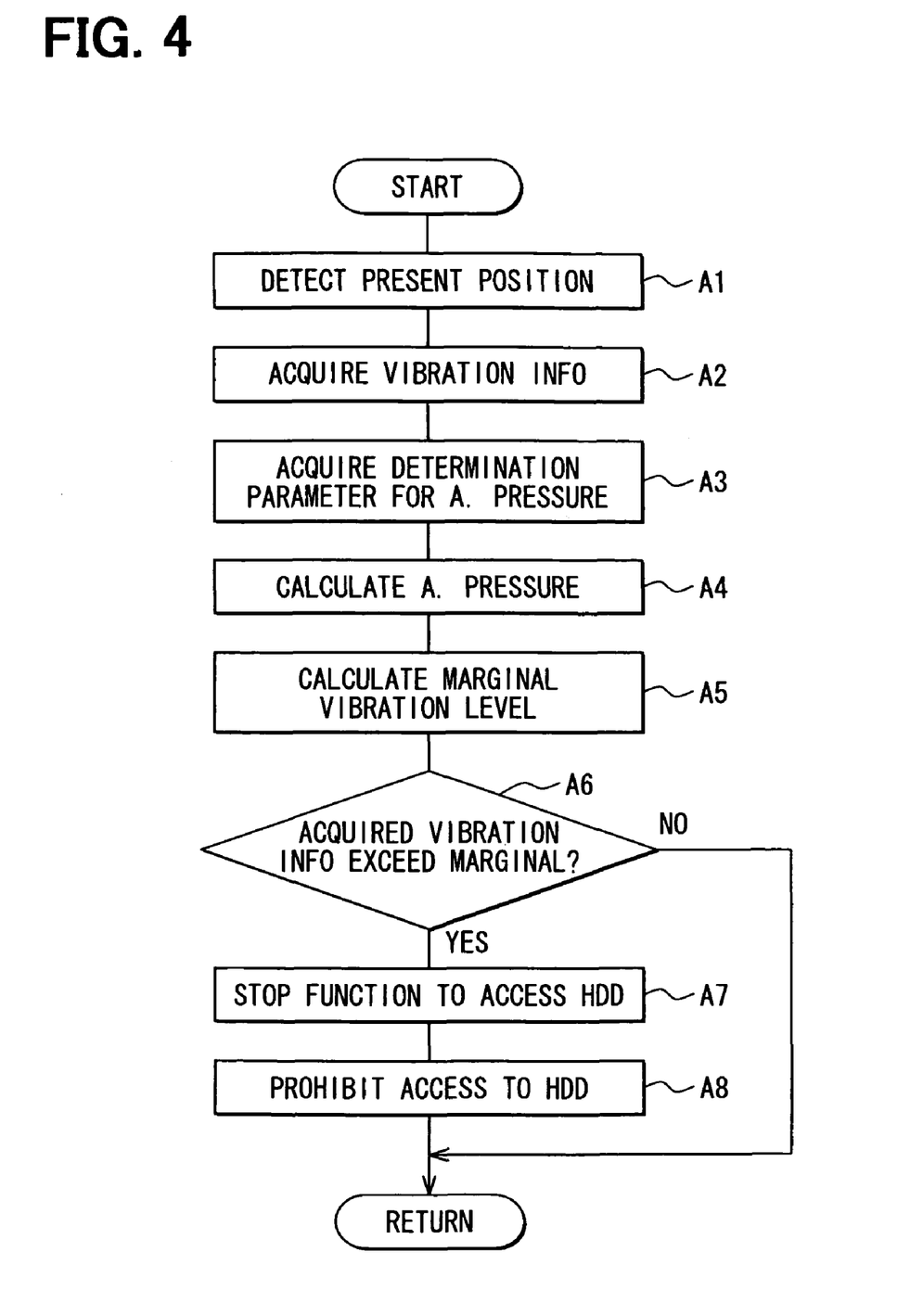
FIG. 4 is a flowchart illustrating a control process for prohibiting an access to a hard disk drive of the navigation apparatus according to the second embodiment.

FIGS. 3 and 4 illustrate a second embodiment of the present invention. The second embodiment is different from the first embodiment in that an access to the hard disk drive 4 is prohibited further in consideration of a vibration amount generated from a travel of a subject vehicle. That is, in the second embodiment, as illustrated in FIG. 3, the control circuit 2 is connected to a vibration sensor 15 to measure a vibration amount of the vehicle. At the time of an actual travel of the vehicle, the control circuit 2 is configured to record, as vibration information, (i) a present position and (ii) information on a vibration amount detected by the vibration sensor 15 at the present position, in the hard disk drive 4.

The control circuit 2 executes a control process for prohibiting an access to the hard disk drive 4 as shown in FIG. 4, in similarity with the first embodiment. After detecting a present position (A1), vibration information relative to a position ahead of the vehicle by a predetermined distance is acquired by accessing the hard disk drive 4 (A2). Thus, processing A2 may function as a vibration acquisition means or unit. Then, the control circuit 2 acquires an altitude of the present position and a temperature detected by the temperature sensor 5 like the first embodiment (A3). An atmospheric pressure is then calculated (A4).

Next, the control circuit 2 calculates, from the calculated atmospheric pressure, a wind force of air streams produced by rotation of the magnetic disk; then, the control circuit 2 calculates a marginal vibration level which can hold the magnetic head in the lifting state where the magnetic head is floating from the magnetic disk by virtue of the calculated wind force (A5). Thus, processing at A5 may function as a marginal vibration acquisition means or unit. The wind force can be calculated from a density of the air (parameter: atmospheric pressure), a viscosity of the air, a rotational speed of the rotation disk, etc. The marginal vibration level can be calculated from a wind force, a mass of the magnetic head, etc.

The control circuit 2 acquires a vibration amount, which is assumed to be generated in the vehicle at the time when the vehicle will travel a predetermined distance ahead of the present position, and then determines whether the acquired vibration amount at the time of the travel exceeds the marginal vibration level (A6). Thus, processing at A6 may function as a determination means or unit. When it is determined that the vibration amount exceeds the marginal vibration level, a function which needs an access to the hard disk drive 4 is suspended or stopped (A7) in similarity with the first embodiment. Further, an access to the hard disk drive 4 is thereby prohibited (A8). In contrast, when it is determined that the vibration does not exceed the marginal vibration level, permission of an access to the hard disk drive 4 is continued. The processing is then returned.

Third Embodiment

Figure 5:
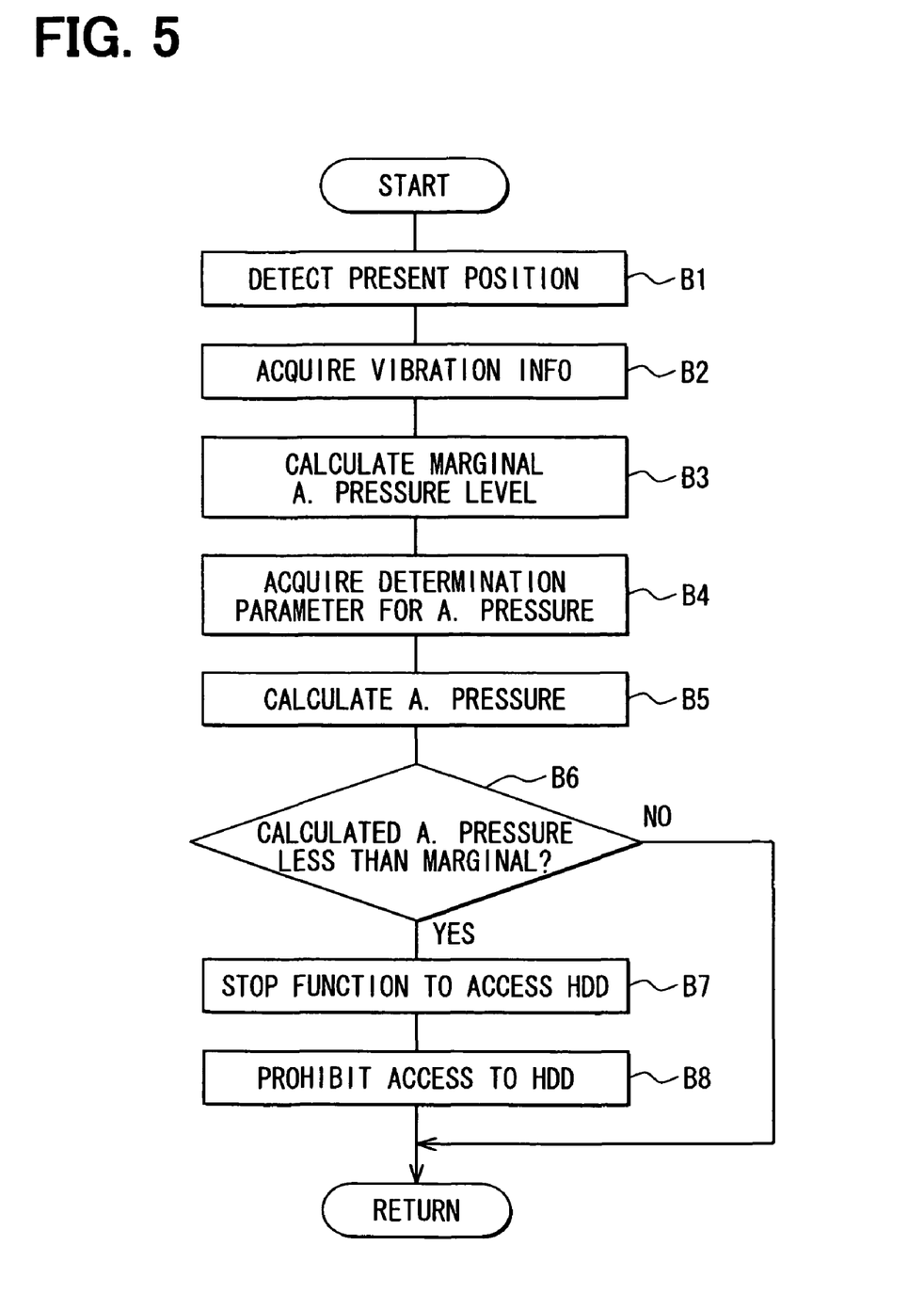
FIG. 5 is a flowchart illustrating a control process for prohibiting an access to a hard disk drive of a navigation apparatus according to a third embodiment of the present invention.

FIG. 5 illustrates a third embodiment of the present invention. The third embodiment is similar with the second embodiment in that an access to the hard disk drive 4 is prohibited in consideration of a vibration amount generated from a travel of a subject vehicle. The third embodiment is different from the second embodiment in the following: the limit of an atmospheric pressure (marginal atmospheric pressure level) which prevents the contact between the magnetic head and the magnetic disk even with a vibration amount at a travel point; and an access to the hard disk drive 4 is prohibited when an atmospheric pressure is less than the marginal atmospheric pressure level.

That is, also in the third embodiment, as illustrated in FIG. 4, the control circuit 2 is connected to the vibration sensor 15 to measure a vibration amount of the vehicle. At the time of an actual travel of the vehicle, the control circuit 2 is configured to record, as vibration information, (i) a present position and (ii) information on a vibration amount detected by the vibration sensor 15 at the present position, in the hard disk drive 4. With a start of the control process, i.e., flowchart of FIG. 5, the control circuit 2 acquires a present position, vibration information of a predetermined distance point ahead of the present position in the heading direction (B1, B2). Next, the control circuit 2 acquires a vibration amount from acquired the vibration information, and calculates a marginal atmospheric pressure level (B3). Thus, processing at B3 may function as a marginal atmospheric pressure acquisition means or unit.

Then, the control circuit 2 acquires an altitude of the present position and a temperature detected by the temperature sensor 5, both of which are the determination parameters of an atmospheric pressure (B4), and calculates an atmospheric pressure of the present position (B5). The control circuit 2 determines whether the calculated atmospheric pressure of the present position is less than the marginal atmospheric pressure level (B6). When it is determined that it is less than the marginal atmospheric pressure (B6: YES), a function which needs an access to the hard disk drive 4 is stopped (B7). Access to the hard disk drive 4 is thereby prohibited (B6).

Other Embodiments

The present invention is not limited to the embodiments described above and illustrated in the drawings, and can be modified or expanded as follows. The determination parameters (determination information) for presuming an atmospheric pressure are not restricted to two, i.e., an altitude and an internal temperature of the hard disk drive 4. Further, in addition to an altitude and an internal temperature of the hard disk drive 4, one or more of weather, air temperature, and humidity can be added.

The determination parameter for presuming an atmospheric pressure can be only an altitude. In this case, calculation of an atmospheric pressure at S3 in FIG. 2 can be eliminated. It is determined whether an altitude of the present position is greater than or equal to an altitude corresponding to the atmospheric pressure illustrated with the predetermined value P0 at S4. When the determination is affirmed, processing proceeds to S5; when the determination is negated, processing is returned.

An air pressure sensor may be provided to thereby directly measure an atmospheric pressure of a present position. Moreover, an atmospheric pressure may be acquired by asking an information center to provide it via a communication link. Vibration information may be previously written in the hard disk drive 4. Altitude information may be acquired from positioning information of GPS. Vibration information at A2 of FIG. 4 and at B2 of FIG. 5 may be acquired with respect to a present position, instead of a predetermined distance ahead of the present position. Vibration information may be previously written in the map data.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A navigation apparatus for a vehicle, the apparatus storing map data in a hard disk drive having a magnetic disk and a magnetic head, reading from the hard disk drive map data relative to a proximity of a present position acquired by a present position detection device, and displaying the map data in a display device,
the apparatus comprising:
means for acquiring an atmospheric pressure of the present position using atmospheric pressure determination information or an atmospheric pressure sensor measuring an atmospheric pressure of the present position;
means for acquiring a vibration amount generated by a travel of the vehicle;
means for acquiring a marginal atmospheric pressure that corresponds to an atmospheric pressure amount which enables the magnetic head to maintain a lift from the magnetic disk when it is supposed that a vibration amount of the vehicle corresponds to the vibration amount acquired by the vibration amount acquiring means; and
means for stopping a function needing an access to the hard disk drive when an atmospheric pressure measured by the atmospheric pressure acquiring means is less than the marginal atmospheric pressure acquired by the marginal atmospheric pressure acquiring means.

2. The navigation apparatus according to claim 1, wherein the atmospheric pressure determination information includes at least altitude information included in the map data.

* * * * *